Feb. 17, 1970  H. A. CUINIER  3,495,824
FLUID RESISTANT TYPE EXERCISING DEVICE
Filed Dec. 19, 1966  4 Sheets-Sheet 3
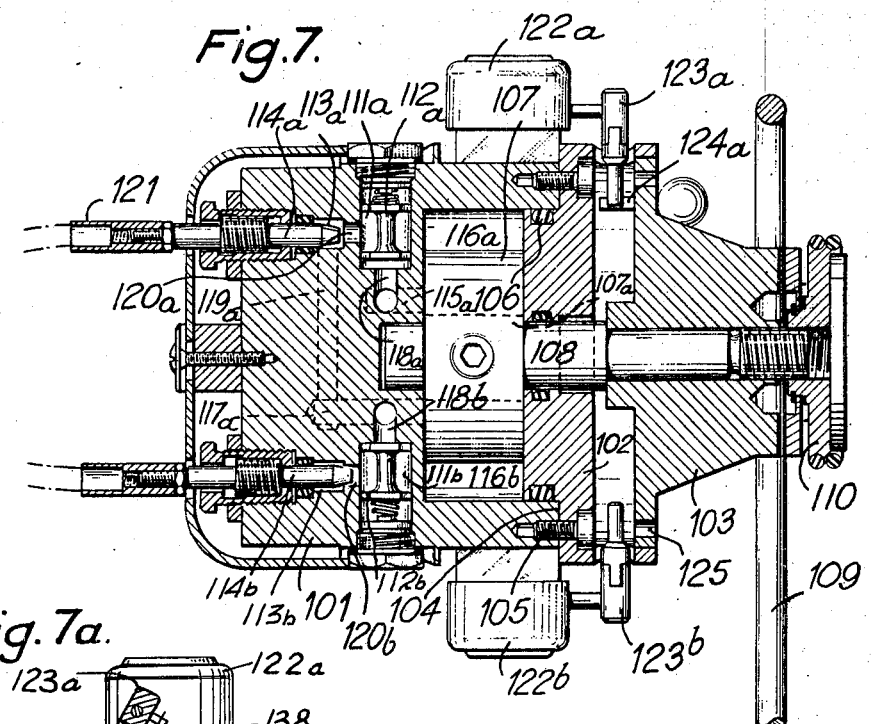
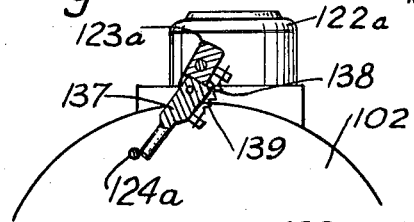
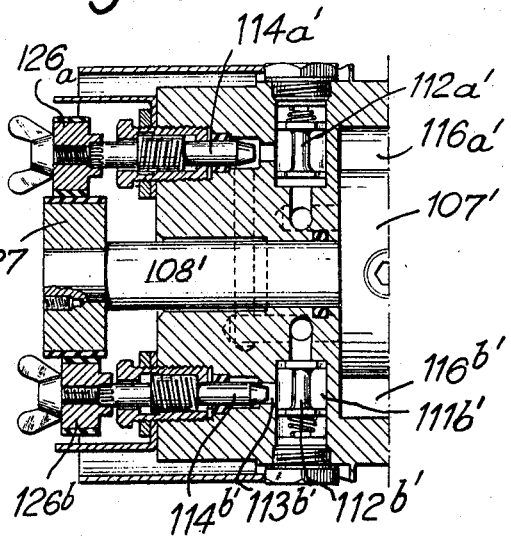
INVENTOR
HENRI ALEXANDRE CUINIER

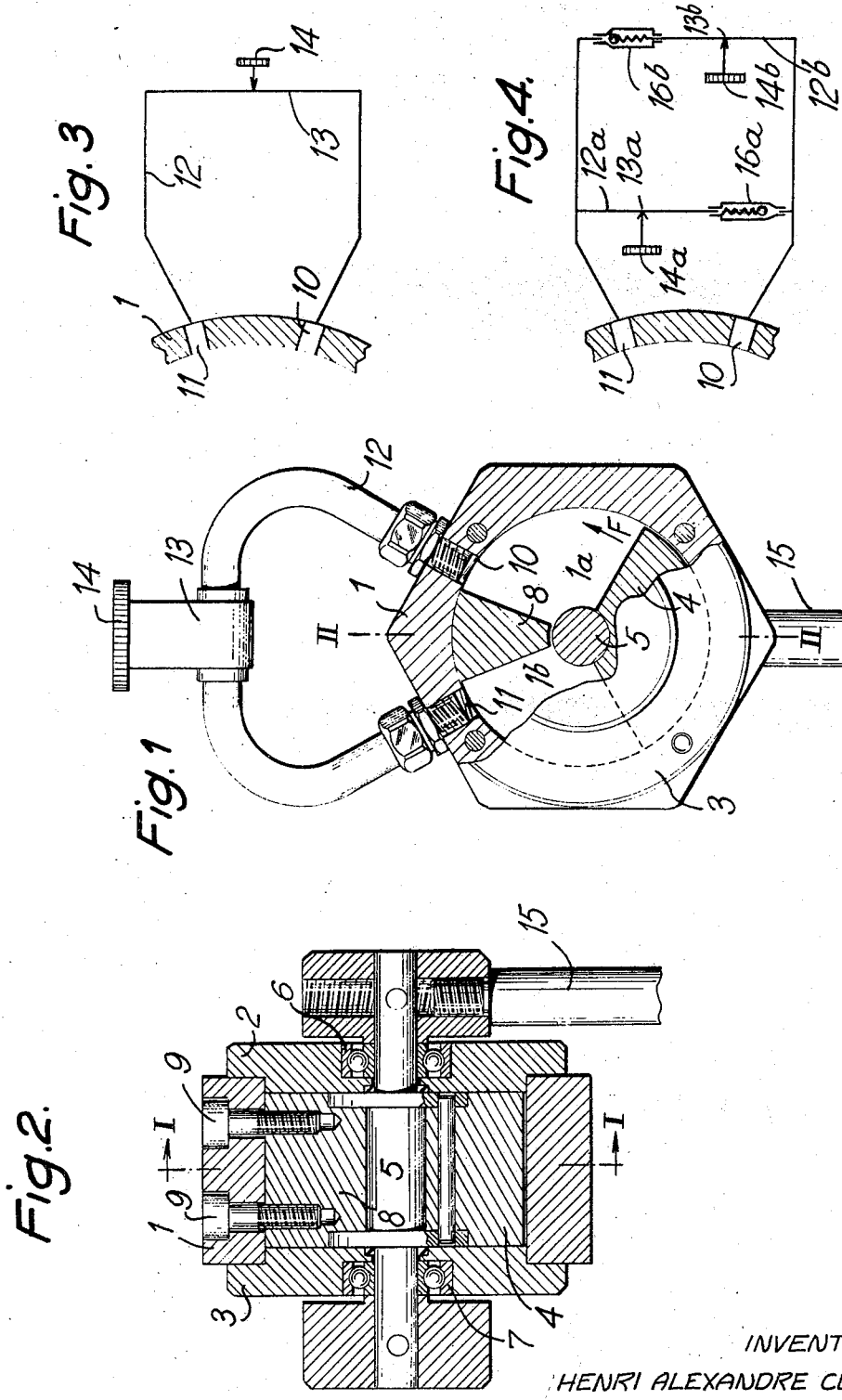

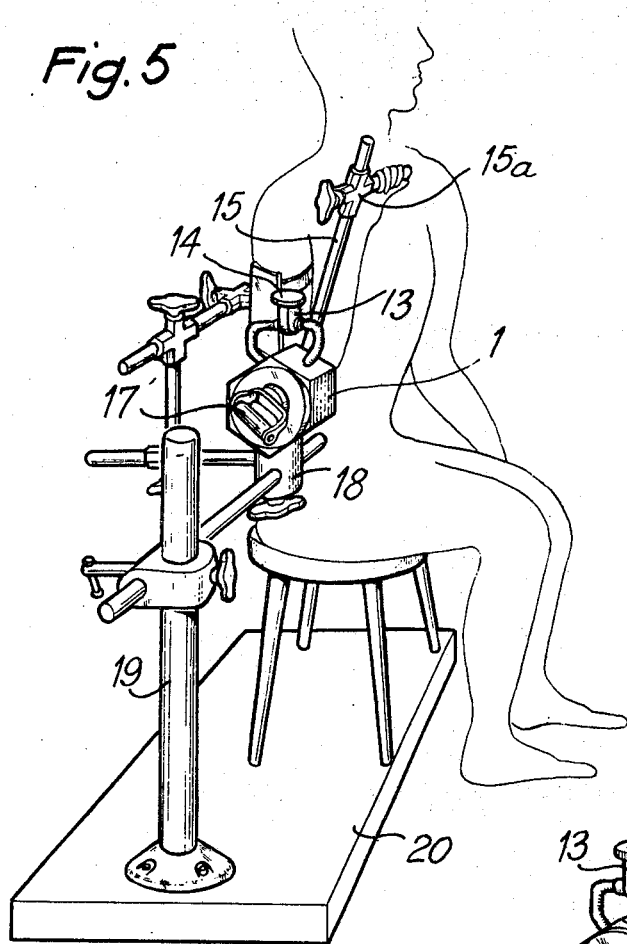
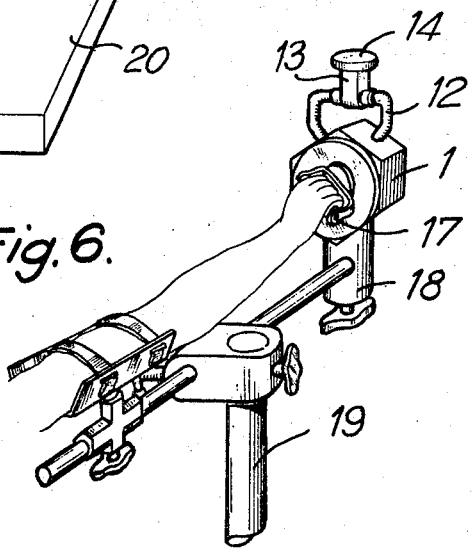

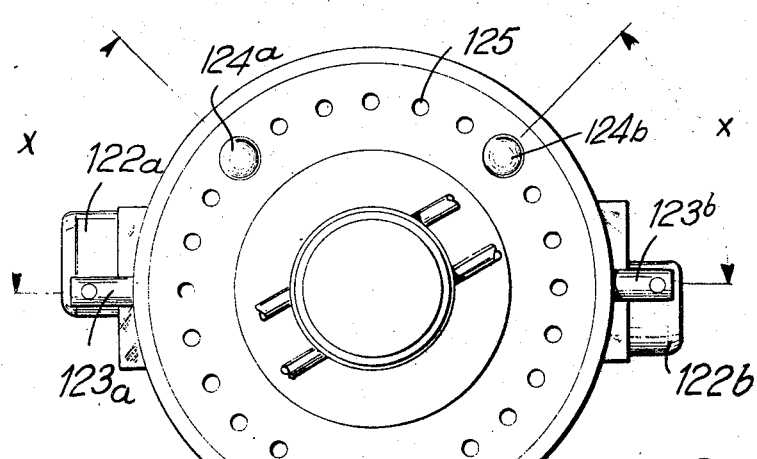
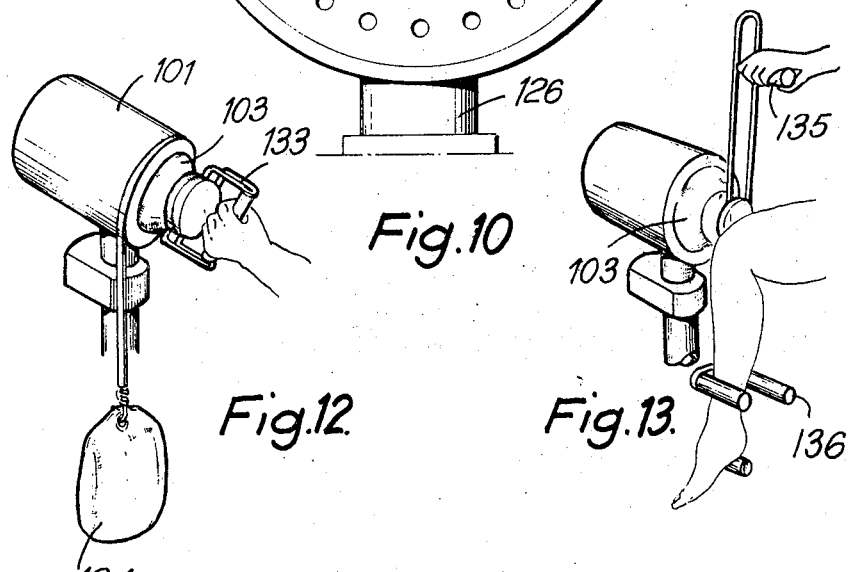
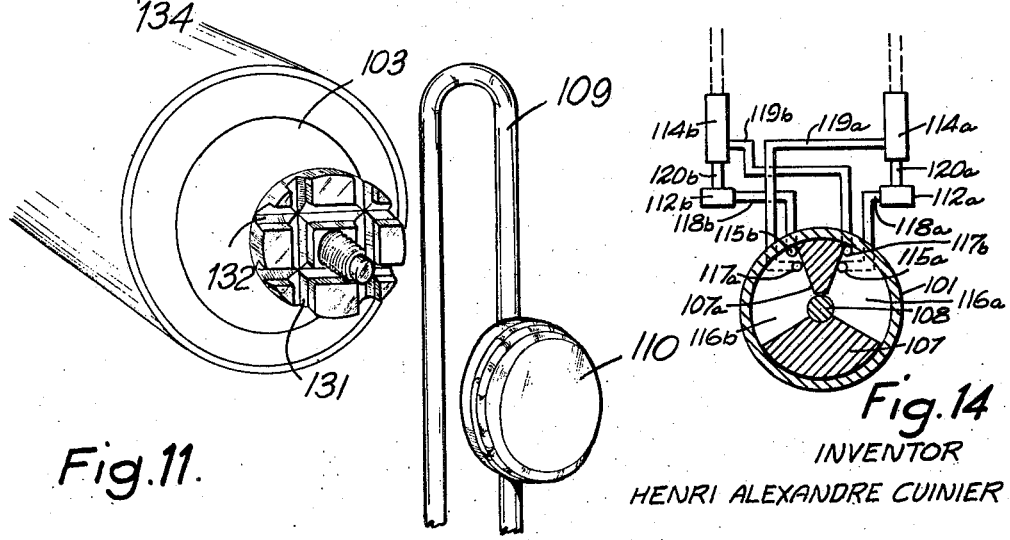
Fig. 10
Fig. 12
Fig. 13
Fig. 11
Fig. 14
INVENTOR
HENRI ALEXANDRE CUINIER

United States Patent Office 3,495,824
Patented Feb. 17, 1970

3,495,824
FLUID RESISTANT TYPE EXERCISING DEVICE
Henri Alexandre Cuinier, Usine du Chene Vert,
Marmande, Lot-et-Garonne, France
Filed Dec. 19, 1966, Ser. No. 608,478
Claims priority, application France, Jan. 12, 1966,
45,618; July 27, 1966, 71,055
Int. Cl. A63b 21/12, 23/00
U.S. Cl. 272—80                                      27 Claims

ABSTRACT OF THE DISCLOSURE

Apparatus using, as the force opposing the muscle, the resistance produced by a liquid flowing through a constriction, the liquid being driven through the constriction by a piston and cylinder device operated by muscular force. The invention provides an opposing force in both directions of the movement by using two constrictions through which the liquid is caused to flow during the forward and backward directions of the movement, respectively.

---

Already known are muscular rehabilitation and kinestherapy appliances with which the muscles can be exercised by opposing gravity-produced resistance to them, that is to say by raising weights.

Such appliances can be used only in the atmosphere or on land and are therefore unusable for balneotherapy. Further, the opposing force always acts in the same direction and serves only for one muscle to the exclusion of the opposing muscle. In addition, appliances which make use of weights call for a somewhat complex system of pulleys.

If the weights are replaced by springs, not only do the latter have the same disadvantage of unidirectional application of the force, but also the resistance is not constant since the tension of the spring varies with its degree of deformation. Lastly, if a braking system is used, the brake will wear out and is subject to jamming.

In the case of weights and springs, adjustment of the force is not convenient since it requires the weight or the spring to be changed; in other words not only must a full set of weights or springs be available, but also adjustment is not continuous. If a brake is used, the force cannot be measured rapidly with an inexpensive means.

The present invention relates to apparatus for overcoming these drawbacks.

The apparatus according to the invention uses, as the force opposing the muscle, the resistance produced by a liquid flowing through a constriction, the liquid being driven through the constriction by a piston and cylinder device operated by muscular force.

This arrangement readily makes available an opposing force in both directions, either by reversing the direction of flow of the liquid through the constriction, or by using two constrictions through which the liquid is caused to flow during the forward and backward directions of the movement, respectively. Further, adjustment presents no difficulty since the section of the constriction can be varied by means of a valve or the like, and such adjustment can be continuous.

In one particularly simple and inexpensive form of embodiment of the invention, said apparatus consists basically, after the fashion of a double-acting pump, of a chamber divided by a piston into two compartments of variable volume, and a conduit which contains the variable-section constriction and interconnects said two compartments in such manner that, in the course of its back and forth motion, the piston causes the liquid to flow from one compartment to the other alternately.

In an alternative constructional form, the interconnecting conduit divides into two branches each containing a variable constriction and a check valve, these two valves being arranged so that one of the branches is crossed by the liquid in one direction while the other branch is blocked by its valve, and vice versa in the other direction.

Preferably, the pump is of the rotary-piston variety.

With a view to reducing the number of component parts in the apparatus and thereby simplifying its manufacture while at the same time giving it a more functional and pleasing appearance, it will be found of advantage to devise the apparatus as a single unit and, in particular, to accommodate the interconnecting conduit within the body of the apparatus itself. Accordingly, in one specific form of embodiment of the invention, the interconnecting conduit is formed within the wall of the cylinder of the apparatus, and this wall additionally embodies the constriction element or elements and the check valve or valves. In one advantageous constructional form, the constricting element or elements can be provided with visible controls external to the apparatus. Further, the apparatus can in certain cases be used in the submerged position or at ground level and it may be of advantage to avoid compelling the user to submerge below the water or to stoop in order to adjust the constriction elements; accordingly, the apparatus may be provided with remote control means of said constriction.

Moreover, from the point of view of the effectiveness of the exercises, it will be useful to seek to obtain with an apparatus according to the invention effects similar to those achieved with such appliances as chest-expanders which are based on the resistance of elastic mechanical members. With such appliances, the resistance to the movement increases as the latter progresses. This is extremely advantageous since it is possible in this way to obtain a force which increases progressively and, whether in extension or in traction, the angle between two segments diminishes; also, physiologically speaking, the smaller this angle, the greater can be the muscular force exerted.

For this reason, in accordance with the invention, the constriction opening and closing elements are rigidly connected to the piston or to parts associated thereto (such as its shaft), so that movement of the piston in a given direction should cause progressive closure of the constriction and opening thereof when the piston moves in the other direction. In one preferred form of embodiment, the constriction control elements include wheels cooperating with a drum carried on the piston shaft.

In comparison with conventional appliances of the chest-expander type, the subject apparatus of this invention thus offers the big advantage, in the case of a two-branch conduit, of making the magnitudes of the forces adjustable in both directions, in extension as well as in tension, and for any predetermined angle.

In connection with this working angle, a given amount of piston travel will produce a determinate change in the constriction, depending on the transmission ratio. For this reason, in accordance with the invention, the piston travel is adjustable by means of stops and the number of movements can be recorded by a limit-counter which would thus provide a check as to whether the full number of movements has been executed.

It is also useful, however, to be able to verify that all the exercises are carried out properly, i.e. that each piston stroke is accomplished fully from one end to the other. For this reason also, the apparatus according to the invention includes two recording or checking devices, located respectively at the two limits of travel of the piston or of a part rigid therewith.

Also arising is the problem of the relationship between the amplitude to be given to the movements and the coresponding forces to be exerted. Now it so happens that, for a given transmission ratio, the positional angle of the piston will not necessarily correspond to the position of the elements needed to obtain the desired change in the constriction section. In accordance with the present invention, it is necesary, in order to adjust this position, that the constriction control elements be capable of being set into the desired position. This can be accomplished for example by combined friction and sliding of the constriction control elements over the part rigid with the piston actuating same.

With regard to linking the apparatus to the user, it should be noted that in certain cases such appliances are devised so as to be positioned in virtually fixed relationship to the horizontal, with different sets of exercises requiring different orientations of the control element and a variable distance between the user and the appliance. An apparatus according to the invention accordingly includes an operating member which is slidable in relation to the apparatus and rigidly connectable thereto in different positions and which can be made fast with the apparatus at different angles. Preferably, two mutually perpendicular alternative positions are used, and in one advantageous form of embodiment, said operating member comprises tubular elements slidable in different sets of grooves embodied on the apparatus.

Lastly, in order to prevent the user from assisting a movement in its active phase with means authorized for the passive phase, the present invention provides for the use of an operating member having an element which is retractable in one direction but provides positive thrust in the other; preferably, said element comprises a knuckle-joint and a stop.

The description which follows with reference to the accompanying non-limitative exemplary drawings will give a clear understanding of how the invention can be carried into practice and will disclose yet further features thereof.

In the drawings:

FIGURE 1 shows in front elevation and partial section through the line I—I of FIGURE 2, the pump of an apparatus according to the present invention;

FIGURE 2 is a section on the line II—II of FIGURE 1;

FIGURE 3 is a diagrammatic illustration of the interconnecting conduit;

FIGURE 4 is a diagrammatic illustration of a two-branch interconnecting conduit;

FIGURE 5 is an overall view showing an example of utilization of the subject apparatus of the invention;

FIGURE 6 shows another possible application of the apparatus;

FIGURE 7 is a sectional view, on a plane taken through the axis of the apparatus, of a second form of embodiment of the invention;

FIGURE 7a is a section of FIGURE 7 on the right of the catches;

FIGURE 8 is a corresponding fragmental view of an alternative constructional form involving progressively exerted force;

FIGURE 9 shows diagrammatically the means for actuating the constricting elements of the apparatus of FIGURE 8;

FIGURE 10 shows the apparatus of FIGURE 7 after a rotation through 90 degrees;

FIGURE 11 is an exploded perspective view of the apparatus of FIGURE 7 showing the manner of securing the operating member;

FIGURE 12 shows a specific configuration for use in wrist twisting exercises;

FIGURE 13 shows another configuration of the apparatus for use in leg bending exercises; and FIGURE 14 is a schematic view of the second form of embodiment of the invention, detailed in FIGURE 7.

Referring to the accompanying drawings, there is shown thereon a cylinder 1 of circular internal section, which is closed by two end-plates 2 and 3 and within which is movable a cylindrical-sector-shaped piston 4 supported on a shaft 5 coaxial with the inner cylinder surface and carried on two anti-friction bearings 6 and 7 housed respectively in end-plates 2 and 3. The space bounded by the two end-plates is divided into two compartments 1a and 1b by piston 4 and by a partition wall 8 which is likewise cylinder-sector-shaped and which is secured to cylinder 1 by two screws 9.

Piston 4 is able to swing between two limits defined by wall 8. On opposite sides of the latter are formed, in cylinder 1, two ports 10 and 11 which are interconnected by a conduit 12 having connected thereinto a constricting element 13, the variable aperture of which is controlled by a knob 14, or the like. Constricting element 13 could be a needle valve, for instance.

It will readily be appreciated that if piston 4 rotates in the direction of arrow F it will cause the liquid contained in the cylinder to flow through port 10 out to port 11 by way of constricting element 13, and that said element will oppose to this flow a resistance adjustable by means of knob 14. Conversely, when piston 4 rotates in the opposite direction, the liquid will flow through port 11 out to port 10, again via constriction 13.

The angular travel of piston 4 is limited by the fixed "dead" angle subtended by the sides of partition wall 8. Such angular travel may be equal to 180 degrees or more. Adjustable stops may be provided to limit the angular travel as desired, since it is by no means essential that the piston reach a limit position determined by wall 8.

Adequate clearances are provided between wall 8 and shaft 5 and between piston 4 and cylinder 1 to prevent friction or seizure, for the pressure differential across compartments 1a and 1b being small, leaks through such clearances will be negligible in relation to the flow across constriction 13.

It may be desirable for the opposing forces to be different in the two directions. Accordingly, in the apparatus shown in FIGURE 1, provision could be made for adjustable stop means controlled by shaft 5 for modifying the position of knob 14 each time the limit of piston travel is reached and whereby knob 14 is set in two different positions corresponding respectively to the back and forth motions of piston 4.

Recourse may alternatively be had to the arrangement shown in FIGURE 4 in which conduit 12 is divided into two branches 12a and 12b, said branches having connected thereinto, in series, a constriction 13a and a check valve 16a, and a constriction 13b and a check valve 16b, respectively, with check valves 16a and 16b being fitted in opposite senses. Thus, when the liquid flows through port 10 to port 11, valve 16a opens and valve 16b closes, so that the liquid flows uniquely through branch 12a, and vice versa. It is therefore possible to adjust the forces corresponding to the two directions of motion independently by means of knobs 14a and 14b.

To use the apparatus, there is secured to one end of shaft 5 an operating grip which the patient works to exercise certain of his muscles.

FIGURE 5 shows an example of application in which the patient acts on a lever 15 fitted with a grip 15a and secured to shaft 5 in the manner shown in FIGURE 2.

Reference to FIGURE 6 shows that it is possible to mount directly on shaft 5 a grip 17 which the patient works by a circumduction of the wrist.

As shown in FIGURES 5 and 6, cylinder 1 is equipped with a base 18 enabling it to be secured to a suitable arrangement of bars carried by a pillar 19 secured to a support 20.

As FIGURE 5 also shows, a lever 15 may be fixed to one end of shaft 5 and a grip 17 to the other end thereof.

The foregoing examples are given for indicative purposes only, and it will be appreciated that there is virtually no limit to the variety of possible applications, ranging form oscillation of the trunk on the fifth lumbar vertebra to physical rehabilitation of a finger-joint. These examples suffice, however, to demonstrate that the apparatus, while remaining relatively compact, will enable a great many different combinations to be obtained with a single set of bars.

By mounting two pumps on a single shaft and connecting the hydraulic circuits in opposition, it is easily possible to obtain a device with alternating motion, of the pedal-driven variety, for simultaneously exercising the muscles of both legs.

The subject apparatus of this invention can be equipped with different instruments, examples being pressure gauges connected into the hydraulic circuit and suitably graduated for measuring the force exerted, counters to indicate the number of strokes of the lever or other operating means, and a graduated dial to indicate the angular travel set by the stops referred to precedingly. On the basis of the data provided by such instruments, the supervising practitioner can then plot graphs of the angles, force and number of movements, as a function of time, to enable him to follow his patients' progress in a scientific way.

Referring next to FIGURE 7, the apparatus shown thereon consists basically of a substantially bowl-shaped casing 101, a flange 102 and an operating head 103. Flange 102 is flat and formed with a rim 104, whereby it can be fitted into casing 101 for closing same and then secured in position by screws 105, a seal 106 being provided to ensure perfect leaktightness. The cavity formed between casing 101 and flange 102 is cylindrical and contains a cylinder-sector-shaped piston 107 the arcuate surface and the two flat sides of which are in contact with the casing and the flange. Piston 107 is supported on a shaft 108 which is coaxial with the casing and one end of which is rotatably supported therein, and the other end, together with a leaktight seal, is supported in flange 102, through which it protrudes. In FIGURE 7, the piston is viewed looking on its arcuate surface and consequently masks a likewise cylinder-sector-shaped partition wall 107a rigid with casing 101 and positioned symmetrically in relation to piston 107, on the side of shaft 108 remote therefrom, in a manner similar to the embodiment illustrated in FIGURE 1.

Operating head 103 is shaped substantially as a cone frustum the larger base of which is formed with a collar facing flange 102. Head 103 engages, by means of an axial bore therethrough, over the protruding portion of shaft 108 and bears against a step formed on the latter. The smaller base of frusto-conical head 103 is fitted, in the manner to be described hereinafter, with an actuating arm 109, and a tapped cap 110 is tightened down over the matchingly threaded end of shaft 108 whereby to secure said arm in said head and to secure the latter against said step formed on shaft 108.

The solid end of casing 101 is thick enough to enable a double flow circuit to be formed therethrough. Said circuit includes two cylindrical housings 111a and 111b for valves 112a and 112b and two substantially cylindrical housings 113a and 113b for constriction needle-valves 114a and 114b. The valve housings open out on to the cylindrical casing walls have their axes perpendicular to the casing axis, and are sealed off by plugs against which the valves are spring-loaded. The needle-valve housings open out on to casing end-face remote from head 103 and their axes are parallel to the casing axis. Further, housings 111a and 113a are positioned symmetrically with housings 111b and 113b in relation to the diametrical centerplane through partition wall 107a, and the axes of the former two housings are concurrent, as are likewise those of the latter two housings.

Referring now to FIGURE 7 in conjunction with FIGURE 14, the two branches of the circuit also include a number of holes formed in the bottom of the casing. In the case of the first branch, two blind inlet and outlet holes 115a and 117a respectively are formed parallel to shaft 108 and extend respectively from the compartments 116a and 116b which are bounded in the cylindrical chamber by piston 107 and partition wall 107a. The hole 115a meets at right angles a passageway 118a linking it with housing 111a, and hole 117a meets at right angles a passageway 119a linking it with housing 113a, while housings 111a and 113a are interconnected by a passageway 120a the portion of which having port in housing 113a forms a seat for needle-valve 114a. The second branch of the circuit similarly includes two axial inlet and outlet holes 115b and 117b, respectively, see FIGURE 14, two passageways 118b and 119b connecting them to housings 111b and 113b, which housings are themselves interconnected by a passageway 120b.

Substantially midway along their shanks, needles 114 are formed with a screw-thread thereon enabling them to rotate within matchingly tapped bushings inserted into housings 113, and are additionally fitted with seals, and their externally located heads are rigidly connected to flexible control cables 121.

Casing 101 further carries two oppositely mounted registering means or meters 122a and 122b of any convenient known type which are activated each time their respective levers are moved by associated control means or catches 123a and 123b respectively. Each catch is provided with an arm 137 pivoted thereon, said arm having an abutment stop 138 which can seat against said catch and an elastic return means or spring 139 being connected between said arm and said catch (whereby to be operative in one direction only and inoperative in the other) and extends into the gap between flange 102 and head 103, and said catches can be activated respectively by control members or pins 124a and 124b positioned in one of several holes 125 formed in the rim of head 103.

The principle of operation of the apparatus hereinbefore described is as follows.

If, responsively to arm 109, piston 107 moves toward compartment 116a, the fluid therein flows through passageways 115a and 118a and valve 112a (the latter retracting to allow it to flow through, and compressing its spring in the process); the liquid then flows through passageway 120a and the constriction produced by needle 114a, and finally enters the second compartment 116b through holes 119a and 117a. Conversely, when the piston rotates in the opposite direction, see FIGURE 14, the liquid flows from compartment 116b to compartment 116a, via passageways 115b and 118b, valve 112b, passageway 120b, the constriction produced by needle 114b, and passageways 119b and 117b.

The resistance to the flow offered by the two constrictions permits proportioning the force which the patient must apply to operating arm 109, whether in one direction or the other; further, this force can be adjusted at different values by rotating the heads of the needle valves to alter their positions, this being accomplished if necessary with the remote control cables 121. These forces can be adjusted differently for the two directions of motion and can be gradually increased in magnitude by advancing the needle valves between successive sets of exercises.

Each movement by the patient causes pin 124a to operate catch 123a, so that counter 122a thus records the number of movements carried out. As shown in FIGURE 10, the apparatus is mounted on a pillar 126 and its various parts are disposed so that piston 107 is in its midway position. In this position, pin 124a is at an angle $x$ in relation to pin 123a so that the patient must execute a movement of amplitude $x$ with respect to the midway position in order that pin 124a can operate counter 122a through the agency of catch 123a.

In cases where the patient is required to execute a movement of amplitude $2x$, in order to be able to vertify that the movement is fully executed, a second pin 124b is provided which operates counter 122b when the patient causes the piston to cover the complementary half-stroke.

In its constructional aspects, the apparatus shown in FIGURE 8 is generally identical to that of FIGURE 7 but employs a different needle valve control system. In this case the heads of needles 114a and 114b are splined and carry wheels 126a and 126b which engage thereon and are secured by butterfly nuts. Said wheels are fitted with tires which are in contact with a further tire fitted to a drum 127 fast with the end of shaft 108 which, in this form of embodiment, passes right through the end of casing 101 and projects therefrom. On their externally visible sides, wheels 126 bear uniformly spaced marks 128 thereon, as shown in FIGURE 9. Drum 127 bears two further marks 129 so as to indicate the position of the externally visible piston in relation to the casing. Pointers 130 are secured to casing 101, facing the two wheels 128 and the drum 129, respectively. It is most important to note that in this particular constructional form the two screw-threads used to move the needle valves through their associated bushes have inverse pitches, whereas in the apparatus described with reference to FIGURE 7 the two pitches were in the same sense.

Adjustment and operation of the needle valves of the apparatus shown in FIGURE 8 take place as follows.

When the piston completes a full stroke from compartment 116b to compartment 116a, it displaces the two needle valves 114a and 114b through the agency of drum 127 and wheels 126. Wheels 126a and 126b rotates in the same direction but, due to the oppositely cut screwthreads, needle 114a moves toward its seat whereas needle 114b moves away from its seat, and vice versa during the return stroke of the piston. Hence, during piston travel in one direction, there is gradually increasing resistance to the flow of liquid from compartment 116a to compartment 116b, such progressively increasing resistance being due to gradual closure of needle 114a; thus the force to be exerted when the piston travels in this direction is a progressively increasing one, similarly to the force to be exerted with chest-expanders. Conversely, during return travel of the piston, it is needle 114b which gradually closes and offers increasing resistance to the flow of liquid from compartment 116b to compartment 116a.

It will be noted that any desired pattern of variation of the forces can be obtained by merely loosening the butterfly nuts, withdrawing wheels 126 and resetting the needle valves to the required degree of penetration in relation to the position of the piston at the time. The wheels can then be refitted and the apparatus will operate with the new settings.

Such adjustment is obtained by means of marks 128 and 129, for when mark 129 registers with pointer 130 this indicates that piston 107 is in its midway position. If it is desired to make the patient execute a movement of amplitude $x$ on either side of this position, then wheels 126 must be removed, the drum 127 (and hence the piston) rotated through an angle $x$ with the aid of mark 129, and needle 114a screwed in until it bears on its seat, and the wheel 126a refitted. Drum 127 must next be rotated in the opposite direction through an angle $2x$, needle 114b screwed fully home, and wheel 126b refitted. This ensures progressive resistance in both directions, reaching a maximum value after the piston has rotated through an angle $x$ from its midway position, as was required. Obviously, however, the apparatus could alternatively be employed with forces which, though progressive, attain different peak magnitudes in the two directions of the exercising movement.

Referring next to FIGURE 11, the actuating head 103 shown thereon has it smaller base formed with two pairs of grooves 131 and 132. The two grooves 131 are mutually parallel, and perpendicular to the two grooves 132. These grooves intersect within said base, and their cross-section is formed of two initially parallel and subsequently converging sides. Either pair of grooves can thus receive the operating arm 109, which consists of a rod shaped into a closed oblate loop with parallel sides.

Prior to being secured by cap 110, arm 109 can be slid along the grooves so as to adjust the apparatus to the distance from the patient. In addition, arm 109 can be lodged in either of the two sets of grooves, whereby the apparatus can be made to suit the orientation of the member to be exercised and to the nature of the exercise to be performed.

As FIGURE 12 clearly shows, wrist twisting exercises can be carried out by substituting for arm 109 a grip 133 which is likewise formed with two branches adapted to engage in said head grooves and is equipped with a handle parallel to said branches. FIGURE 12 also shows that the appliance can be fitted with a counterweight 134, whereby the return movement can be made effortlessly in cases where movements in only one direction are beneficial to the patient, and the force to be exerted during the useful direction of travel will be increased by said counterweight.

Referring lastly to FIGURE 13, it will be seen that, for knee-bending movements, arm 109 is secured at its mid-point to the operating head of the apparatus, its upper length receiving a return grip 135 and its lower length a yoke and footrest arrangement obtained with three bars 136 designed to straddle the ankle and support the foot. In cases where only one direction of movement is useful, the patient operates handle 135 for the return stroke but is prevented from assisting the useful movement by a knuckle-joint and abutment incorporated in handle 135.

It goes without saying that many changes and substitutions of parts may be made in the forms of embodiment described hereinabove without departing from the spirit and scope of the invention. By way of example, the fluid flow circuits could be differently arranged and control of the constricting means could be otherwise devised. Further, operating members other than arm 109 or handle 133 could be provided, while the mechanical counters could be replaced by electric contact points connected to pulse counters with audible or visual representation means.

What I claim is:

1. In a physical culture apparatus, more particularly intended for muscular rehabilitation or kinestherapy, comprising a casing enclosing a chamber containing a fluid and divided into a first compartment and a second compartment, a sweeping member positioned in said chamber between said first compartment and said second compartment in substantial fluid tight relation with said casing and movable in a direction oriented between said first compartment and said second compartment, a first passageway and a second passageway both provided between said first and second compartments, a first constriction means positioned in the path of said first passageway, a first check valve means positioned in the path of said second passageway for preventing said fluid to flow in said second passageway from said first compartment to said second compartment and operating means for operating said sweeping member, whereby said sweeping member accomplishes a travel under action of said operating means and with a number of strokes equal to how many times said operating member is actioned, the improvement wherein the apparatus comprises a second constriction means positioned in the path of said second passageway and a second check valve means positioned in the path of said first passageway for preventing said fluid to flow in said first passageway from said second compartment to said first compartment.

2. An apparatus as claimed in claim 1, wherein said first passageway is provided in a first intercommunicating means positioned outside said casing between a first inlet and a second inlet and said second passageway is provided in a second intercommunicating means positioned outside said casing between said first and second inlets, said casing being formed with a first opening through which said first inlet communicates with said first compartment and a second opening through which said second inlet communicates with said second compartment.

3. An apparatus as claimed in claim 1, wherein said first and second passageways are formed within the body of said casing.

4. An apparatus as claimed in claim 1, which includes at least one registering means for registering said number of strokes of said sweeping member and at least one control member for operating said registering means, said control member being movable with said sweeping member and said registering means being secured to said casing on the path of said control member.

5. An apparatus as claimed in claim 1, which includes a first registering means and a second registering means each for registering said number of strokes of said sweeping member, a first control member and a second control member for operating respectively said first registering means and said second registering means, said first and second control members being movable with said sweeping member and said first and second registering means being secured to said casing respectively on the path of said first control member and on the path of said second control member.

6. An apparatus as claimed in claim 4, wherein said control member is adjustable in position relatively to said sweeping member.

7. An apparatus as claimed in claim 4, wherein said registering means is provided with a control means of the pivot-and-abutment type, said control means being further provided with elastic return means.

8. An apparatus as claimed in claim 4, which include an actuating head secured to said operating means, said control member comprising a pin secured onto said actuating head.

9. An apparatus as claimed in claim 8 wherein said actuating head is formed with at least one hole, said pin being fastened in said hole.

10. Apparatus as claimed in claim 8 wherein said actuating head is formed with a plurality of spaced holes for receiving said pin.

11. In a physical culture apparatus, more particularly intended for muscular rehabilitation or kinestherapy, comprising a casing enclosing a chamber containing a fluid and divided into a first compartment and a second compartment, a sweeping member positioned in said chamber between said first compartment and said second compartment in substantial fluid tight relation with said casing and movable in a direction oriented between said first compartment and said second compartment, a first passageway and a second passageway both provided between said first and second compartments, a first adjustable constriction means positioned in the path of said first passageway, a first check valve means positioned in the path of said second passageway for preventing said fluid to flow in said second passageway from said first compartment to said second compartment and operating means for operating said sweeping member, the improvement wherein the apparatus comprises a second adjustable constriction means positioned in the path of said second passageway and a second check valve means positioned in the path of said first passageway for preventing said fluid to flow in said first passageway from said second compartment to said first compartment.

12. An apparatus as claimed in claim 11, wherein said first and second adjustable constrictions means are provided with means for closing gradually said first constriction means and simultaneously opening gradually said second constriction means in one direction of travel of said sweeping member and vice versa in the opposite direction of travel thereof.

13. An apparatus as claimed in claim 11, wherein each of said first and second adjustable constriction means is fastened to control means external to said casing.

14. An apparatus as claimed in claim 13, wherein said control means are located remotely from said casing.

15. An apparatus as claimed in claim 11, wherein said first adjustable constriction means is a first needle valve having a needle projecting into said first passageway and said second adjustable constriction means is a second needle valve having a needle projecting into said second passageway.

16. An apparatus as claimed in claim 15, wherein each needle valve has a shank formed respectively with a right-hand thread and a left-hand thread each of which cooperates with a female thread rigid with said casing.

17. In a physical culture apparatus, more particularly intended for muscular rehabilitation or kinestherapy, comprising a casing enclosing a cylindrical chamber containing a fluid, a sweeping member, an operative means for said sweeping member including a shaft coaxial with said chamber, extending therethrough and fastened to a first rotative operating member external to said casing, said sweeping member comprising a rotative piston fastened to said shaft in substantial fluid tight relation with said casing, a partition wall extending radially inward from said casing to a point adjacent said shaft, whereby said partition wall and said sweeping member divide together said chamber into a first compartment and a second compartment, a first passageway and a second passageway both provided between said first and second compartments a first constriction means positioned in the path of said first passageway and a first check valve means positioned in the path of said second passageway for preventing said fluid to flow in said second passageway from said first compartment to said second compartment, whereby said sweeping member accomplishes a travel under action of said operating means and with a number of strokes equal is how many times said operating member is actioned, the improvement wherein the apparatus comprises a second constriction means positioned in the path of said second passageway and a second check valve means positioned in the path of said first passageway for preventing said fluid to flow in said first passageway from said second compartment to said first compartment.

18. An apparatus as claimed in claim 17, wherein said piston is circle-sector-shaped.

19. An apparatus as claimed in claim 17, wherein at least one end of said shaft projects externally of said casing and is fastened to said rotative operating member externally of said casing.

20. An apparatus as claimed in claim 19, wherein the second end of said shaft likewise projects externally from said casing and is fastened to a second operating means.

21. An apparatus as claimed in claim 17, including at least one registering means for registering said number of strokes of said piston, an actuating head secured to said shaft and a pin for operating said registering means, said pin being secured on said actuating head and said registering means being secured to said casing on the path of said pin.

22. An apparatus as claimed in claim 21, wherein said actuating head is circumferentially-formed with a plurality of spaced holes for receiving said pin.

23. An apparatus as claimed in claim 17, wherein each of said first and second constriction means is adjustable and fastened to control means comprising means for closing gradually said first constriction means and simultaneously opening gradually said second constriction means in one direction of travel of said piston and vice versa in the opposite direction of travel thereof, said shaft being interlocked with said closing and opening means.

24. An apparatus as claimed in claim 23, wherein said adjustable constriction means is a first needle valve having a neede projecting into said first passageway and said second adjustable constriction means is a second needle valve having a needle projecting into said second passageway, each needle valve having a shank formed respectively with right-hand thread and a left-hand thread each of which cooperates with a female thread rigid with said casing, and wherein each needle valve is coaxial with said shaft and has a needle valve head, said control means comprising a removable wheel supported on the head of each needle valve and a drum fixedly mounted on said shaft and in frictional contact with both of said wheels.

25. An apparatus as claimed in claim 24, wherein said needle valve head project externally from said casing and said shaft has a shaft end projecting externally of said casing, said drum being mounted on said shaft end.

26. An apparatus as claimed in claim 17, wherein said operating member comprises a first element rigid with said shaft and formed with a slideways means perpendicular to said shaft, a second element slidable in said slideways means and a clamping means for fastening said second element to said first element.

27. An apparatus as claimed in claim 26, wherein said slideway means include first slideways perpendicular to second slideways.

References Cited

UNITED STATES PATENTS

| 2,068,578 | 1/1937 | Stronach | 272—79 |
| 445,726 | 2/1891 | Coop | 272—72 |

FOREIGN PATENTS

| 1,051,818 | 12/1966 | Great Britain. |
| 806,125 | 9/1936 | France. |

RICHARD C. PINKHAM, Primary Examiner

WILLIAM R. BROWNE, Assistant Examiner

U.S. Cl. X.R.

73—379; 272—67, 79